(12) United States Patent
Crow et al.

(10) Patent No.: US 11,454,403 B2
(45) Date of Patent: Sep. 27, 2022

(54) DOUBLE OVEN GAS WITH FAN

(71) Applicant: WHIRLPOOL CORPORATION, Benton Harbor, MI (US)

(72) Inventors: Nicholas E. Crow, Benton Harbor, MI (US); Federico Fiolomia, Cassinetta (IT); Tiziano Lacche, Matelica (IT); Chiara Pascucci, Cassinetta (IT); Valentina Vitaloni, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 179 days.

(21) Appl. No.: 16/557,023

(22) Filed: Aug. 30, 2019

(65) Prior Publication Data

US 2020/0072475 A1 Mar. 5, 2020

(30) Foreign Application Priority Data

Sep. 4, 2018 (EP) .................................... 18192609

(51) Int. Cl.
*F24C 15/32* (2006.01)
*A21B 1/26* (2006.01)
(Continued)

(52) U.S. Cl.
CPC .............. *F24C 15/322* (2013.01); *A21B 1/26* (2013.01); *F24C 3/004* (2013.01); *F24C 11/00* (2013.01); *F24C 15/16* (2013.01)

(58) Field of Classification Search
CPC ........ F24C 15/322; F24C 3/004; F24C 11/00; F24C 15/16; F24C 1/14; F24C 15/325;
(Continued)

(56) References Cited

U.S. PATENT DOCUMENTS

D282,972 S * 3/1986 Castor ........................... D26/59
4,867,132 A * 9/1989 Yencha ................. F24C 15/322
126/21 A (Continued)

FOREIGN PATENT DOCUMENTS

CN 1891050 A * 1/2007
EP 0245618 A2 11/1987
(Continued)

*Primary Examiner* — Jorge A Pereiro
(74) *Attorney, Agent, or Firm* — Price Heneveld LLP

(57) ABSTRACT

An air baffle unit includes a major housing wall extending in first and second directions to define an exterior side and an interior side, two upper corner output vent openings, first and second laterally opposed side vent openings, and an air intake opening arrangement defined within an intake area along the major housing wall and extending therealong in the first and second directions. The air intake opening arrangement is defined in an intake area and includes first and second pluralities of intake vents positioned within respective first and second open areas of the intake area with first and second closed areas extending between the first and second open areas. The first and second open areas and first and second closed areas each positioned within respective quarters of the intake area. The open areas are displaced relative to each other in both the first direction and the second direction.

20 Claims, 10 Drawing Sheets

(51) Int. Cl.
  *F24C 3/00* (2006.01)
  *F24C 11/00* (2006.01)
  *F24C 15/16* (2006.01)

(58) Field of Classification Search
  CPC ...... F24C 15/327; A21B 1/26; A47J 37/0641; F24F 13/082
  USPC ........................................................ D23/388
  See application file for complete search history.

(56) References Cited

U.S. PATENT DOCUMENTS

| | | | | |
|---|---|---|---|---|
| 4,991,496 | A * | 2/1991 | Kuno | F24F 13/06 454/299 |
| 5,121,737 | A * | 6/1992 | Yencha, III | F24C 15/322 126/21 A |
| 5,222,474 | A * | 6/1993 | Yencha, III | F24C 15/322 126/21 A |
| D372,775 | S * | 8/1996 | Schuler | D23/371 |
| D374,927 | S * | 10/1996 | Chabot | D23/386 |
| D438,948 | S * | 3/2001 | Schrank | D23/393 |
| 6,415,816 | B1 * | 7/2002 | Beckey | E03C 1/12 137/526 |
| D568,460 | S * | 5/2008 | Jacak | D23/388 |
| D702,824 | S * | 4/2014 | Martel | D23/323 |
| D704,318 | S * | 5/2014 | Martel | D23/323 |
| 9,344,787 | B2 * | 5/2016 | Berkman | H04R 1/028 |
| 9,398,357 | B2 * | 7/2016 | Berkman | H04R 1/028 |
| D778,425 | S * | 2/2017 | Jonas | D23/388 |
| 9,609,407 | B2 * | 3/2017 | Berkman | H04R 1/021 |
| D822,821 | S * | 7/2018 | Jonas | D23/385 |
| 10,299,642 | B2 * | 5/2019 | Buchanan | F04D 25/08 |
| 2003/0162492 | A1 * | 8/2003 | Caferro | F24F 13/082 454/289 |
| 2009/0045184 | A1 * | 2/2009 | Nam | F24C 15/322 219/400 |
| 2009/0104051 | A1 * | 4/2009 | Wang | F04D 29/70 417/321 |
| 2010/0092282 | A1 * | 4/2010 | Hwang | F04D 29/422 415/206 |
| 2012/0148394 | A1 * | 6/2012 | Lin | F04D 25/08 415/203 |
| 2012/0192726 | A1 * | 8/2012 | Clearman | A47J 37/0641 99/447 |
| 2015/0117034 | A1 * | 4/2015 | Horng | F21V 29/677 362/373 |
| 2020/0063750 | A1 * | 2/2020 | Yuan | F04D 29/4226 |
| 2020/0191434 | A1 * | 6/2020 | Colehour | F24H 3/0411 |

FOREIGN PATENT DOCUMENTS

| | | | | |
|---|---|---|---|---|
| EP | 2060854 | A1 * | 5/2009 | ............ F24C 15/325 |
| GB | 2109920 | A | 6/1983 | |
| JP | H11166728 | A | 6/1999 | |

* cited by examiner

DOUBLE OVEN GAS WITH FAN

CROSS-REFERENCE TO RELATED APPLICATIONS

This application claims priority to European Patent Application No. 18192609 entitled "DOUBLE OVEN GAS WITH FAN," filed on Sep. 4, 2018, the entire disclosure of which is incorporated herein by reference.

TECHNICAL FIELD

The present disclosure generally relates to a heating arrangement for an oven. In particular, the oven includes a convection unit with a baffle having an intake with open areas displaced horizontally and vertically within respective quarters of an intake area.

BACKGROUND

Various ovens and related cooking appliances may include various types of convection units that are structured and used to circulate heated air within an associated oven cavity. The use of such convection units to circulate heated air can reduce a temperature gradient within an oven cavity, wherein portions closest to the heat source associated with the oven cavity and can improve browning distribution on food items being cooked within the oven cavity. In an example, a convection unit may include a fan mounted within such that at least the blades thereof are positioned within the oven cavity. The convection unit may further include an air baffle structure or assembly mounted in the oven and generally extending over the fan. The baffle unit is used to house and protect the fan, as well as to provide routing of air therethrough and out into the oven cavity for circulation therein. However, certain placement of food articles within the oven cavity, particularly in certain relationships with respect to the baffle unit, may be problematic for certain baffle arrangements, including those in certain types and arrangements of ovens, leading to diminished quality of circulation and related cooking issues.

SUMMARY

In at least one aspect, an air baffle unit includes a major housing wall extending in first and second directions to define an exterior side and an interior side. First and second laterally opposed side vent openings are defined along respective lateral sides of the baffle unit extending from respective side edges of the major housing wall on the interior side thereof. Two other vent openings are placed on the two upper edges, one on the left and one on the right of the upper side of the baffle. An air intake opening arrangement is defined within an intake area along the major housing wall and extends therealong in the first and second directions. The air intake opening arrangement is defined in an intake area and includes first and second pluralities of intake vents positioned within respective first and second open areas of the intake area with first and second closed areas extending between the first and second open areas. The first and second open areas and first and second closed areas are each positioned within respective quarters of the intake area. The open areas are displaced relative to each other in both the first direction and the second direction.

According to another aspect, a convection unit for a gas oven includes a fan including a plurality of blades extending radially from an axis, and an air baffle unit. The air baffle unit includes a major housing wall extending in first and second directions to define an exterior side and an interior side. First and second laterally opposed side vent openings are defined along respective lateral sides of the baffle unit extending from respective side edges of the major housing wall on the interior side thereof. Two other vent openings are placed on the two upper edges, one on the left and one on the right of the upper side of the baffle. An air intake opening arrangement is defined within an intake area along the major housing wall and extends therealong in the first and second directions. The air intake opening arrangement is defined in an intake area and includes first and second pluralities of intake vents positioned within respective first and second open areas of the intake area with first and second closed areas extending between the first and second open areas. The first and second open areas and first and second closed areas are each positioned within respective quarters of the intake area. The open areas are displaced relative to each other in both the first direction and the second direction.

In at least another aspect, an oven includes an interior cavity including an opening, a rear wall opposite the opening, and a floor extending between the opening and the rear wall, a convection unit including a fan having a plurality of blades extending radially from an axis extending from the rear wall generally normal thereto. The convection unit further including an air baffle unit mounted on the rear wall and having a major housing wall extending in first and second directions to define an exterior side and an interior side. First and second laterally opposed side vent openings are defined along respective lateral sides of the baffle unit extending from respective side edges of the major housing wall on the interior side thereof. Two other vent openings are placed on the two upper edges, one on the left and one on the right of the upper side of the baffle. An air intake opening arrangement is defined within an intake area along the major housing wall and extends therealong in the first and second directions. The air intake opening arrangement is defined in an intake area and includes first and second pluralities of intake vents positioned within respective first and second open areas of the intake area with first and second closed areas extending between the first and second open areas. The first and second open areas and first and second closed areas are each positioned within respective quarters of the intake area. The open areas are displaced relative to each other in both the first direction and the second direction. The oven further includes a burner unit having a heat output extending from the floor adjacent the rear wall, the fan drawing air through the first and second open areas of the intake areas and distributing air flow among the four output vents.

These and other features, advantages, and objects of the present device will be further understood and appreciated by those skilled in the art upon studying the following specification, claims, and appended drawings.

DETAILED DESCRIPTION OF EMBODIMENTS

Figure 1:
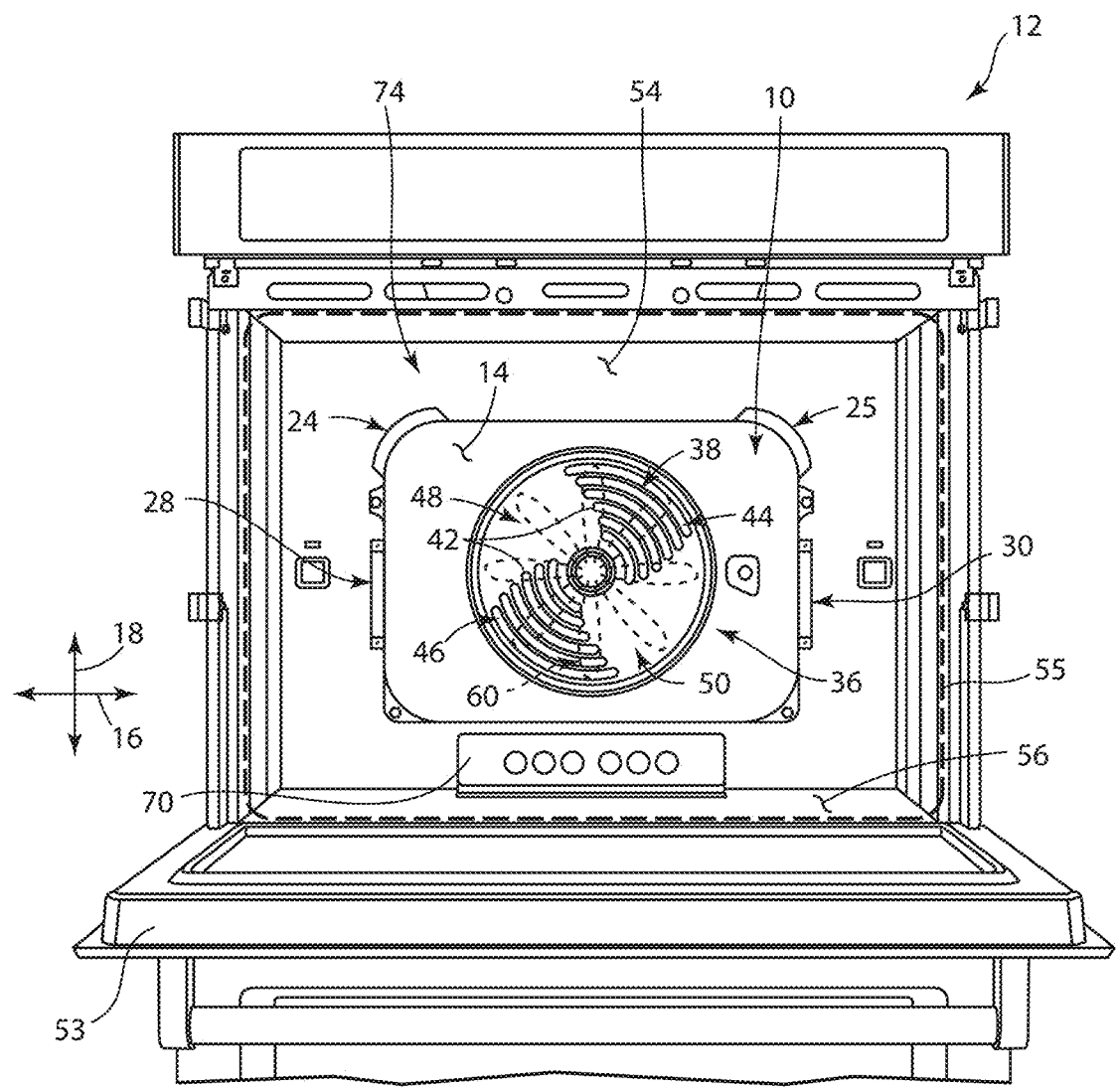
FIG. 1 is a front-perspective view of a portion of an oven, including a cavity with a baffle unit therein.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
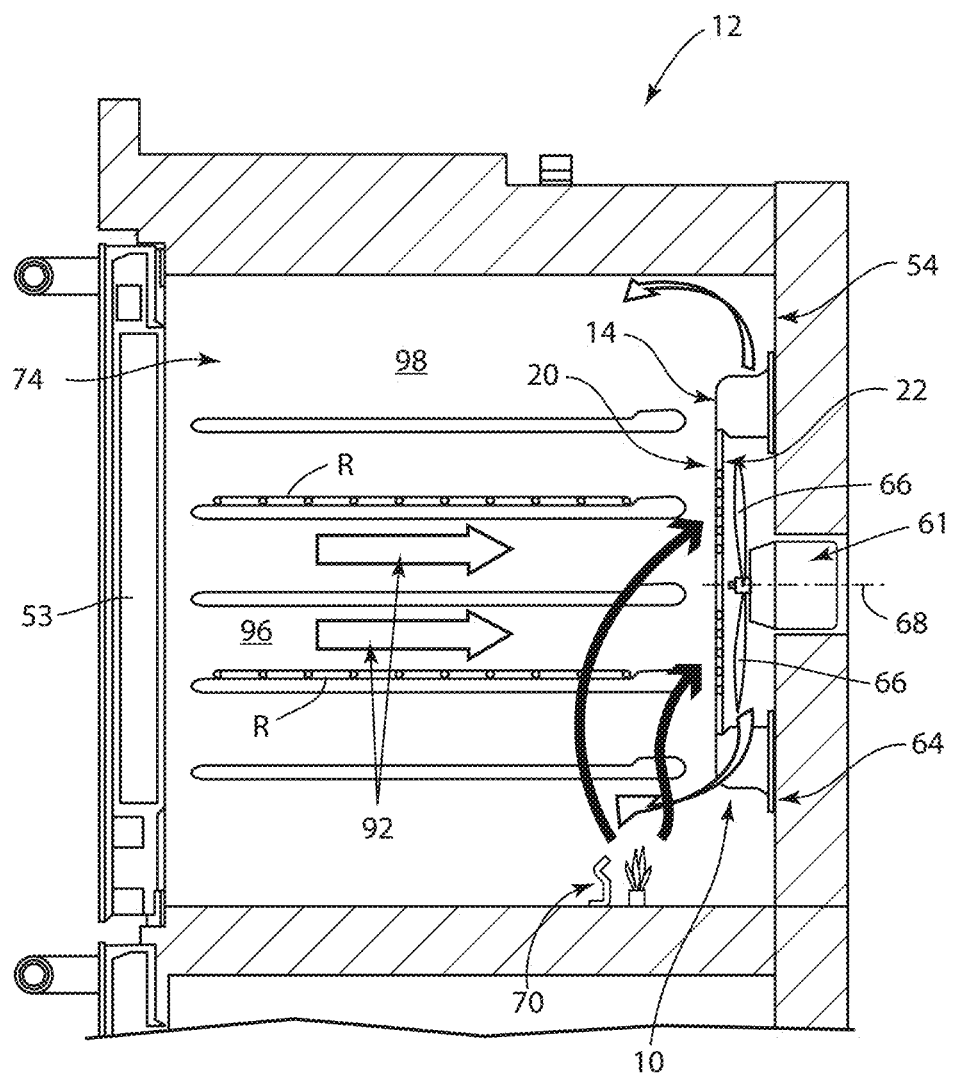
FIG. 5 is a side cross section view of the oven further depicting circulation of air achieved by the baffle unit.

Referring to the embodiment illustrated in FIG. 1, reference numeral 10 generally designates an air baffle unit for use within an oven 12. Baffle unit 10 includes a major housing wall 14 extending in a first direction 16 and a second direction 18 to define an exterior side 20 and an interior side 22, as shown in FIG. 5, of major wall 14. An upper left output vent opening 24 is defined on the left upper corner of the baffle and a second output vent opening 25 is defined on the right upper corner of the baffle as shown in FIG. 1,3,4,6. First and second laterally opposed side vent openings 28 and 30, shown in FIG. 1,3,4,6 are defined along respective lateral sides of the baffle unit 10 and extend from respective side edges 32 and 34 (FIG. 3) of the major housing wall to the rear wall 54 (FIG. 1,5). Baffle unit 10 further includes an air intake arrangement 36 along the major housing wall 14 and extending therealong in the first 16 and second 18 directions, as shown in FIG. 1,3. The air intake arrangement 36 includes first 44 and second 46 open areas sets of intake vents 42 extending oppositely to a first and a second closed areas 48 and 50 (FIG. 1,3). The first and second open areas 44,46 being displaced relative to each other in both the first direction 16 and the second direction 18.

Figure 2:
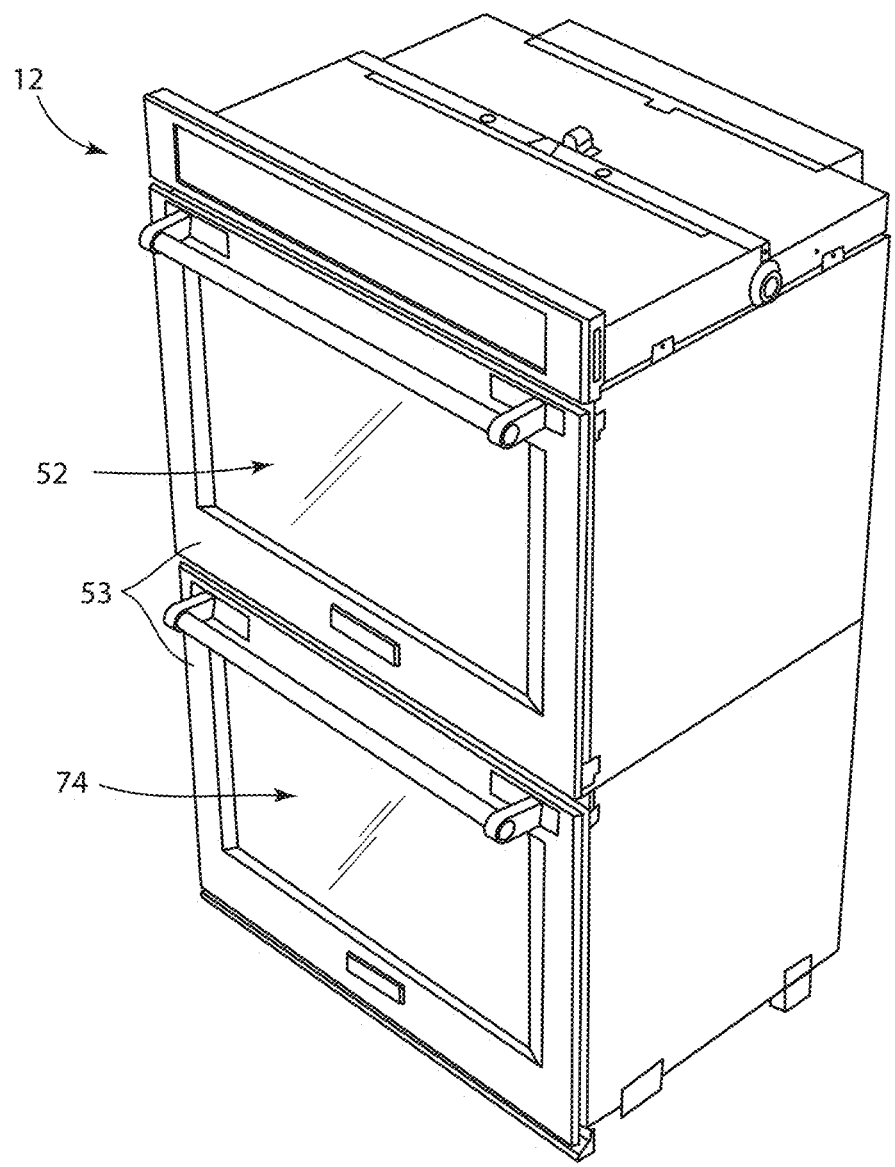
FIG. 2 is a perspective view of the oven.

The above-described baffle unit 10 is useable within an oven 12, shown in one possible example thereof in FIG. 2. In general, as shown in FIG. 1, 2, an oven 12 includes an interior cavity 74 including an opening 55 to the cavity along a front face of the cavity 74 and closeable by a door 53. Oven cavity 74 further defines a rear wall, with same dimensions and opposite the opening 55 and a floor 56 extending between the opening 55 and the rear wall 54 (FIG. 1). In this manner, and as further illustrated in FIGS. 3, and 4, the baffle unit 10 can be associated with and included in a convection unit 58 of the general type associated with a gas oven. In general, such convection units are structured and used to circulate heated air within an associated oven cavity. The use of such convection units to circulate heated air can reduce a temperature gradient within an oven cavity, wherein portions closest to the heat source are associated with the oven cavity and can improve browning distribution on food items being cooked within the oven cavity.

As illustrated, convection unit 58, as discussed herein, includes a fan 60 (FIG. 1) including a plurality of blades 66 (FIG. 1,3,5) extending radially from a fan axis 68 (FIG. 5). Fan 60 is mounted within oven 12 such that at least the blades 66 thereof are positioned within oven cavity 74. Additional components of or associated with fan 60, including a motor 61 (FIG. 5) and one or more mounting components, may be positioned outside of cavity 74 and/or at least partially disposed within cavity 74. The convection unit 58 further includes the air baffle unit 10 mounted on the rear wall and generally extending over fan 60, including over blades 66. In this manner, baffle unit 10 is structured, as further described below, to help control the manner in which fan 60 circulates air within interior 74 of oven 12.

Figure 4:
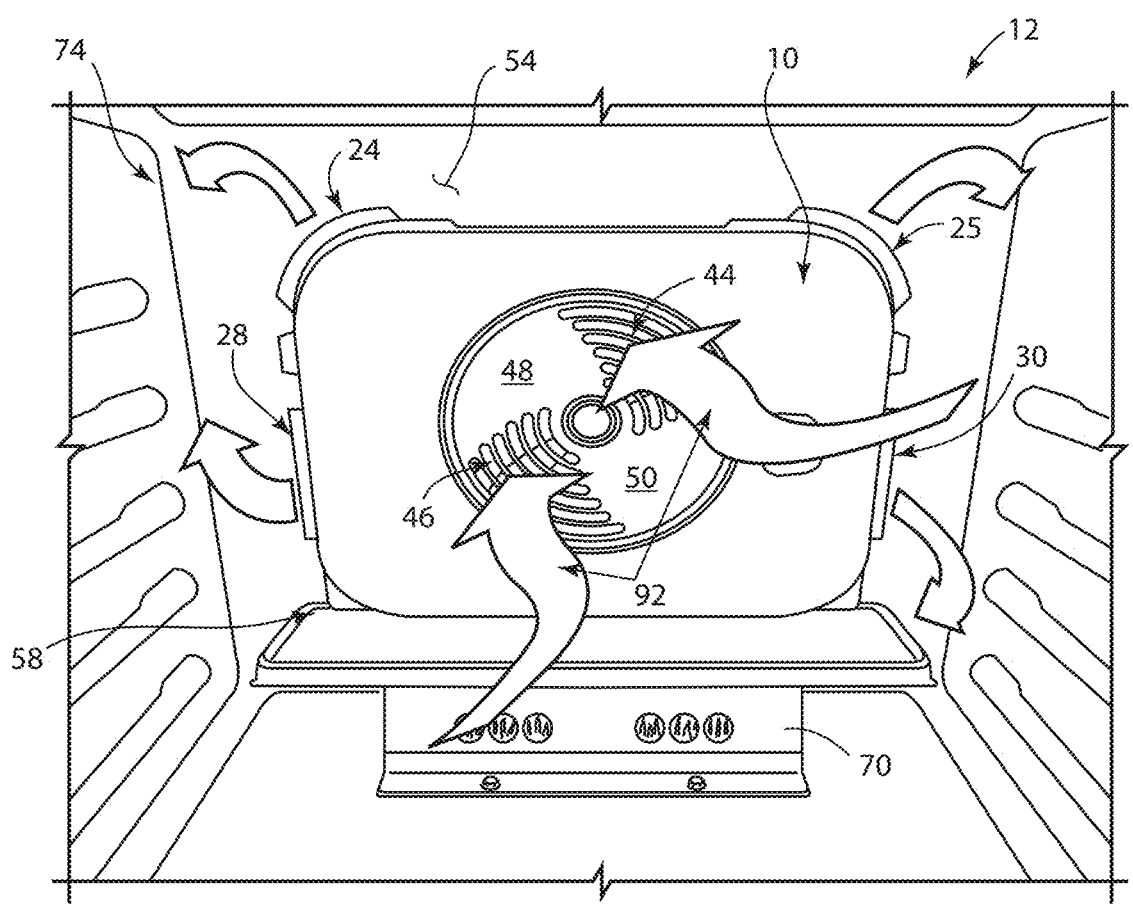
FIG. 4, is a perspective view of the interior of the oven depicting circulation of air achieved by the baffle unit.

Oven 12 further includes a burner unit 70 (FIGS. 1, 4 and 5) positioned so as to extend from a location along the floor 56 of oven cavity adjacent the rear wall 54. Burner unit 70 is of the type generally known and is configured to burn fuel in a controlled manner to produce an adjustable level of heat by way of a variable flame therein. The heat achieved by the flame radiates into cavity 74 and further causes some level of natural convection within cavity 74 by way of the movement of heated air upward within cavity 74 and the corresponding circulation of the comparatively cool air toward the top of cavity 74 being displaced back toward floor 56. As shown in FIG. 4 fan 60 can be operated to draw heated air through the first and second open areas 44,46 of the intake arrangement 36 and creating a distributed air flow regulated by the four side output vents 24,25,28 and 30, as discussed further below.

As further illustrated in FIG. 2, in particular aspect the above-described oven cavity 74, in which convection unit 58 including baffle unit 10 is included, can be one of two cavities in a dual oven arrangement. As such, the convection unit 58 described herein can be what may be considered the "main oven cavity" within such a dual oven arrangement, the oven 12 also including, for example a second cavity 52. In this manner, the designation or consideration of oven cavity 74 as the main oven cavity may be defined by various characteristics thereof within oven 12, overall. In one example, oven cavity 74 may have a higher heating capacity or capability. In other example, cavity 74 may be comparatively larger, or may be a gas oven in a "dual fuel" arrangement (which may include an oven cavity 74 in combination with a microwave oven, electric oven, or the like). In this manner, the presently-described baffle unit 10 arrangement may improve heat circulation as described herein to overcome difficulties in adapting previously existing arrangements to properly function, given, for example, the packaging constraints of such oven 12 arrangements.

The lateral side vent openings 28,30 of the air baffle unit 10 are defined between the respective side edges 32,34 of the major housing wall 14 and the rear wall 54 of the oven cavity 74. The upper corner vent openings 24,25 of the air baffle unit 10 are defined between the respective upper corners of the major housing wall 14 and the rear wall 54 of the oven cavity. Further, convection unit 58 is such that the open areas 44,46 of the intake area 36 are open between the exterior and interior sides 20,22 of the major housing wall 14 with the fan 60 being disposed on the interior side 22 underlying the intake area 36. As shown, to achieve such an arrangement, major housing wall 14 can be the front face of a baffle unit 10 with a set of standoffs 64 shown in FIG. 3,5, extending from major housing wall 14 to support major housing wall 14 away from rear wall 54. Standoffs 64 can extend integrally from major housing wall 14 such that baffle unit 10 can be of a single sheet of stamped, drawn, or otherwise shaped metal. Further, standoffs 64 can be positioned generally adjacent the corners of major housing wall 14 such that lateral side vent openings 28,30 span a major portion of the size of major housing wall 14 in both directions 16,18.

Baffle unit 10, as described, can be affixed to rear wall 54 of oven cavity 74 using various mechanical fasteners (e.g., bolts, rivets, screws or the like), by spot welds, or by the incorporation of interengaging (e.g., press or snap fit) features between standoffs 64 and rear wall 54. Such assembly can, as shown in FIG. 5, result in the interior side 22 of major housing wall 14 being spaced from rear wall 54 by a distance sufficient to receive fan 60, including at least the blades 66 thereof in the space defined between major housing wall 14 and rear wall 54 (with other portions of fan 60 including the motor 61 associated therewith and/or other structures for mounting or otherwise affixing fan 60 with oven 12 positioned behind rear wall 54, for example.

In the above-described arrangement, the vent openings 42 (FIG. 1, 3) within the first and second open areas 44,46 provide for the passage of air through major housing wall 14 from exterior side 20 to interior side 22. In particular, fan 60 can operate by rotation about fan axis 68 to draw air through vent openings 42, which then impinges on rear wall 54 or other internal elements or structures of baffle unit 10 to be directed outwardly through both upper corner vent openings 24, 25 and lateral side vent openings 28, 30 (FIG. 4, 5, 6). As discussed in greater detail below, the arrangement of vent openings 42 within the first and second open areas 44, 46 and the incorporation of first and second closed areas 48, 50 between the open areas 44,46 helps baffle unit 10 distribute the air directed outward thereof evenly between the upper corner vent openings 24, 25 and the first and second lateral side vent openings 28, 30. In this manner, burner unit 70 is provided within cavity 74, such as by being mounted on floor 56 adjacent to rear wall 54 to heat the air, including by radiation and local convection of heat from a flam within burner unit 70, to be drawn into baffle unit 10 such that the heat generated by burner unit 70 is distributed through cavity 74 by baffle unit 10.

Figure 3:
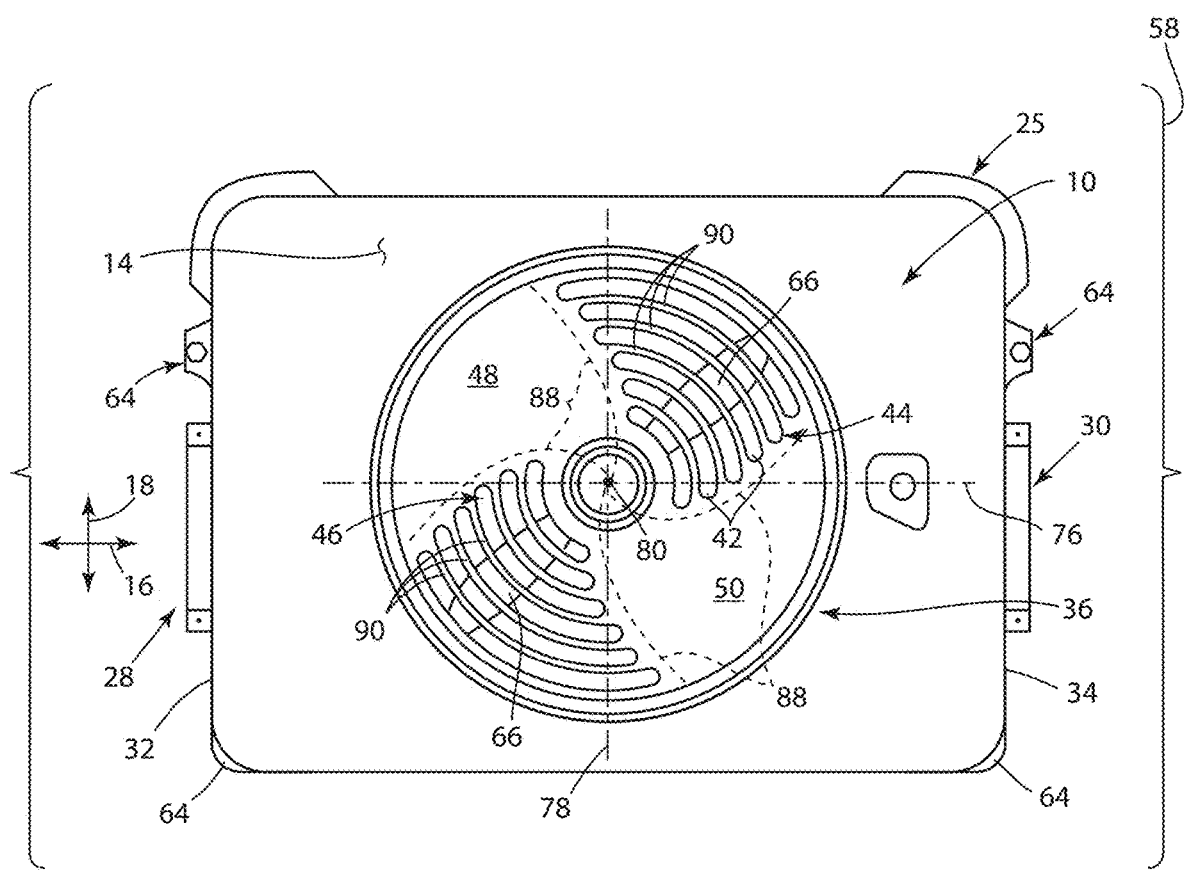
FIG. 3 is a detail view of the baffle unit and related components of a convection unit in which the baffle unit is incorporated.

As shown in greater detail in FIG. 3, first and second axes 76,78 extending, respectively, in the first and second directions 16, 18, divide the intake area 36 into the respective quarters occupied by the first and second open areas 44, 46 and the first and second closed areas 48, 50. The first and second axes 76, 78, in one example, can define an intersection therebetween that is positioned adjacent a geometric center of the major housing wall 14 such that intake arrangement 36 is defined generally centrally along major housing wall 14 and is generally evenly spaced between the respective lateral side output vents 28, 30 and upper corners output vents 24,25. In various examples, the intersection of axes 76,78 may be displaced from the exact geometric center of major housing wall 14 but may generally be adjacent thereto by being positioned within about 4" in either direction 16,18 or within 10% of the total distance in either direction 16,18 with such offset also potentially being different in each direction 16,18, such as by being aligned with the geometric center in first direction 16 and being upwardly offset therefrom by between 1" and 4", for example. As further shown, the fan axis 68 can be positioned along intersection 80 such that fan 60 is centrally aligned with intake arrangement 36.

As shown in FIG. 3, the first and second open areas 44, 46 are primarily oppositely disposed from each other with respect to both the first and second axes 76, 78 and extend generally away from the intersection 80 of the axes 76,78. In the illustrated example, the intake area 36 defines a generally circular area disposed around the intersection of the axes 76, 78 (where fan axis 68 is located) such that the axes 76, 78 divide the intake area 36 into the aforementioned quarter portions. As illustrated in FIG. 3, first open area 44 is primarily positioned in a quarter area of intake area 36 that is disposed oppositely from the quarter in which second open area 46 is primarily positioned across both the first axes 76 and the second axes 78. In this manner, second open area 46 is offset both horizontally (i.e. in first direction 16) and vertically (i.e. in second direction 18) from first open area 44. Similarly, first closed area 48, which is disposed on the same side of first axis 76 as first open area 44 and generally oppositely with respect to second axis 78, is primarily positioned oppositely from second closed area 50 with respect to both the first and second axes 76, 78. Put differently, the open areas 44, 46 alternate with the closed areas 48, 50 when moving in a radial direction about the intersection 80 of axes 76, 78.

As used herein, the description of the various open areas 44,46 and closed areas 48, 50 being positioned "primarily" within a particular quarter of intake area 36 or "primarily" on a particular side of axes 76, 78 does not necessarily indicate that the open area 44, 46 or closed area 48,50 is completely within such a quarter or completely on such a side. Rather, the open areas 44, 46 and closed areas 48, 50 may be shaped such that portions thereof cross the axes 76, 78 to an extent. In such an example, the open areas 44, 46 and closed areas 48, 50 may be considered as being primarily within a particular quarter of intake area 36 or primarily on an particular side of axes 76, 78 by being positioned and shaped such that, for example, the geometric center of the particular area lies within such a quarter or on such a side or that the majority of an area of such an area is in such a quarter or on such a side. In the present example, the open areas 44, 46 and closed areas 48, 50 are generally propeller-shaped such that theoretical boundary lines 88, FIG. 3, between the respective open areas 44, 46 and closed areas 48, 50 are curved to cross the axes 76, 78 one or more times.

Additionally, the areas designated as "open" areas 44,46 are not necessarily completely open, but are generally distinguished from the closed areas 48,50 by the closed areas being completely closed and the open areas 44,46 being at least partially open. In the example illustrated herein, the open areas 44,46 are defined by the above-mentioned vent openings 42 in the form of radially-spaced concentric arced openings through major wall 14 and extending circumferentially between sequential boundaries 88. In this manner, as shown in FIG. 3, a corresponding plurality of grate portions 90 included in major wall 14 are positioned between and separate the vent openings 42 within the open areas 44, 46.

The presence of grate portions 90 (FIG. 3) may help to control the desired air flow (in quantity or with respect to a certain characteristic, such as turbulence or the like) to interior side 22 through vent openings 42. Further the grate portions 90 may help to prevent items from being drawn through open areas 44, 46 and damaging fan 60 or being damaged by fan 60. Accordingly, as discussed herein, the description of the first and second open areas 44, 46, as well as the first and second closed areas 48, 50 occupying respective quarters of the intake area 36 may, consistent with the example shown in FIG. 3, indicate that the theoretical boundary lines 88 separating the open areas 44, 46 from the closed areas 48, 50, regardless of the particular shape, divide the intake area 36 into four generally equal areas (e.g., within about 5% of each other, when comparing open areas 44, 46 to closed areas 48, 50). In general, the boundaries 88 between the respective areas may be considered as extending along the ends of the vent openings 42 (including those most closely adjacent the closed areas 48, 50 in an implementation with multiple radially spaced openings 42 in a single area 44 or 46) or spaced apart therefrom by, for example approximately the width of the grate portions 90.

As shown in FIG. 3, the open areas 44,46 of the intake area 36 are open between the exterior and interior sides 20,22 of the major housing wall 14 and are generally aligned with respective and corresponding portions of an underlying area within which the blades 66 of fan 60 rotate or are otherwise operably disposed. In this manner, the fan 60 operates to draw an intake air flow 92, shown in FIG. 4, in through open areas 44, 46 (including by a portion of fan 60 operating adjacent open areas 44,46), such air being directed (such as by the geometry or operation of fan 60 or other internal veins or other elements within baffle unit 10) out of upper corners output vents 24, 25 and side output vent openings 28, 30. Wherein left opening vents 24, 28 direct the air flow toward the top of the cavity 74 while right opening vents 25, 30 direct the air flow toward the floor 56, as shown in FIG. 4. In this manner, the convection unit 58 works drawing the hot air produced by the burner 70 and evenly distribute hot air in the upper levels of the cavity.

The staggered arrangement of the open areas 44, 46 and the interposed closed areas 48, 50 promotes even distribution between the aggregate of the two lateral side vent openings 28, 30 and upper corners vent openings 24, 25. The positioning of the lateral side vents opening 28, 30 are displaced with respect to the center of the respective side edges 32, 34 in second direction 18. Side vent openings 28, 30 differ in term of opening areas and shape, where side vent 28 is bigger than side vent 30 while upper corner vent opening 24 is bigger than the upper corner vent opening 25.

Figure 6:
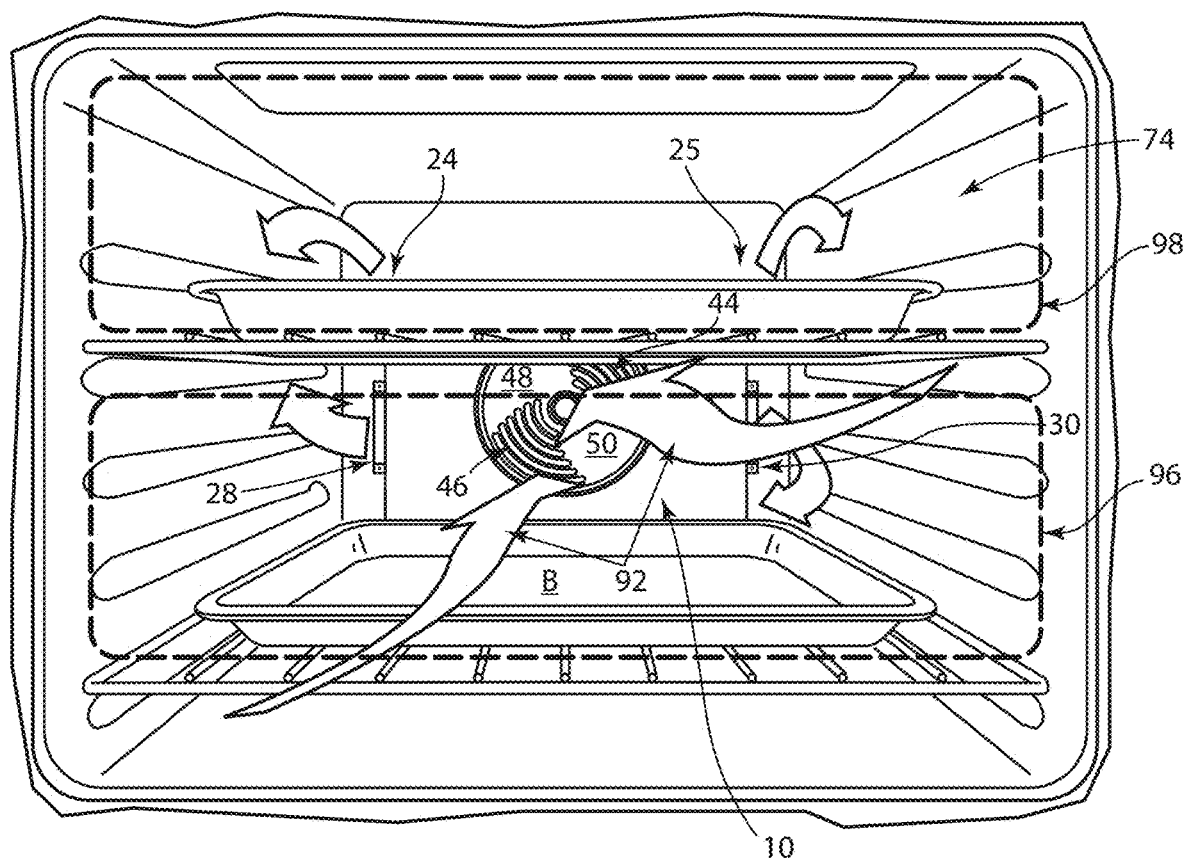
FIG. 6 is a perspective view of the interior of the oven depicting circulation of air achieved by the baffle unit in relation to articles within the oven cavity
Figure 7:
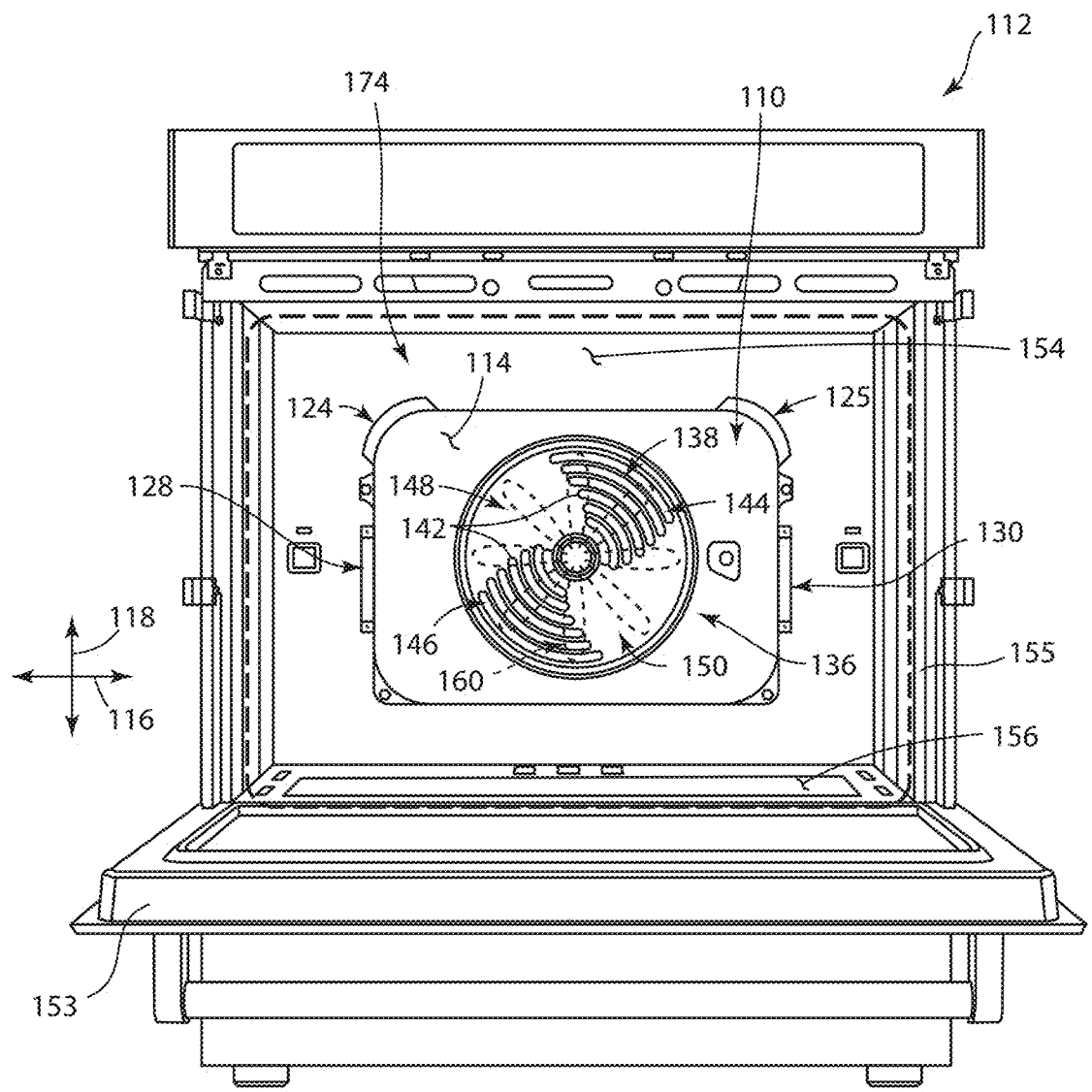
FIG. 7 is a front-perspective view of a portion of an alternate oven, including a cavity with the baffle unit and a heat distribution shield, according to a further aspect of the disclosure, therein.
Figure 8:
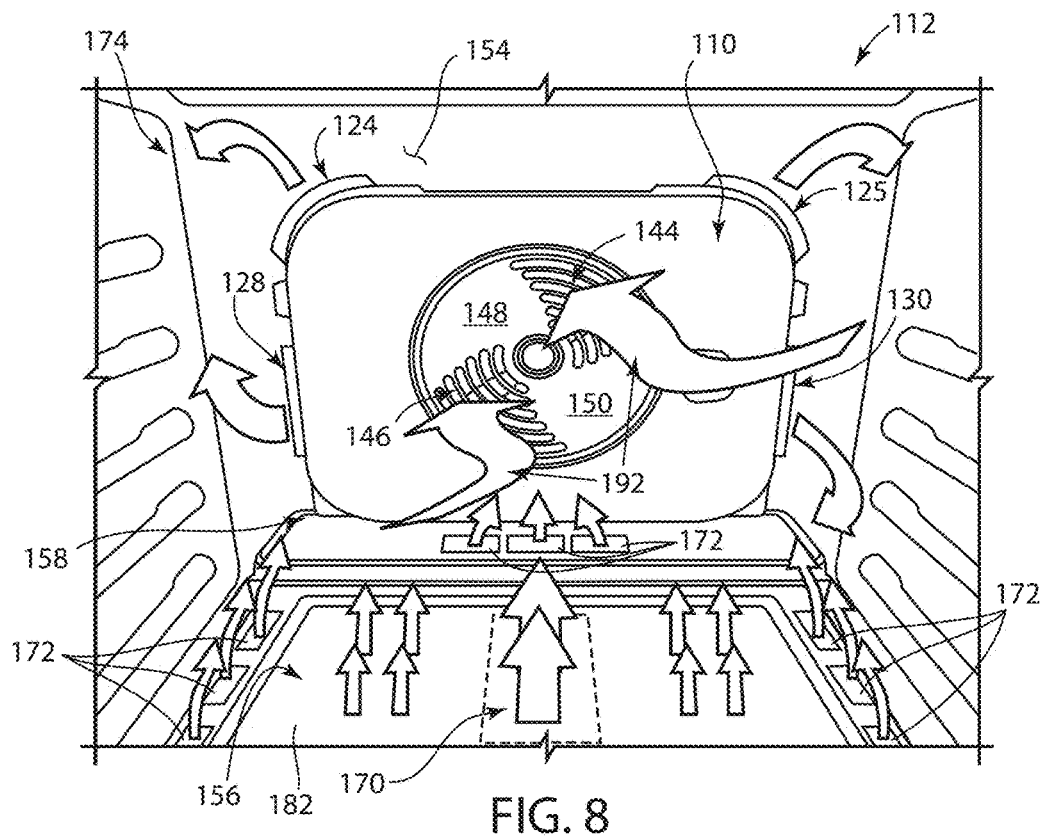
FIG. 8 is a perspective view of the interior of the oven depicting circulation of air achieved by the baffle unit without the heat distribution shield.
Figure 9:
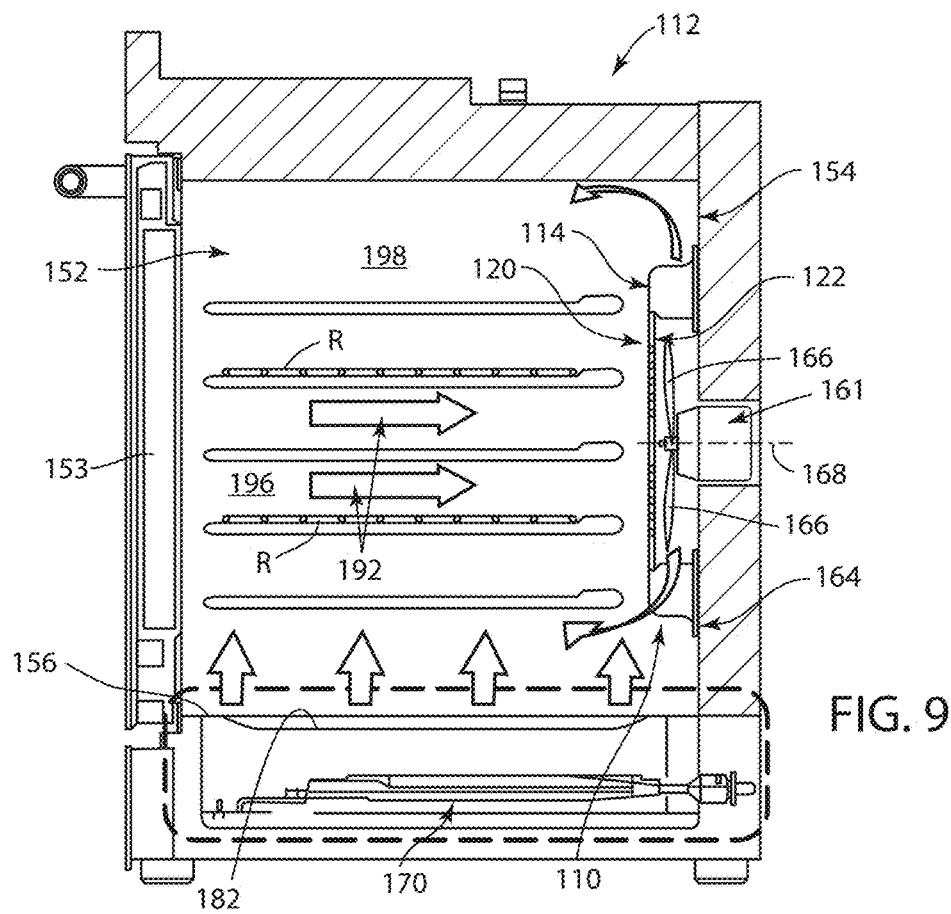
FIG. 9 is a side cross section view of the oven further depicting circulation of air achieved by the baffle unit without the heat distribution shield.
Figure 10:
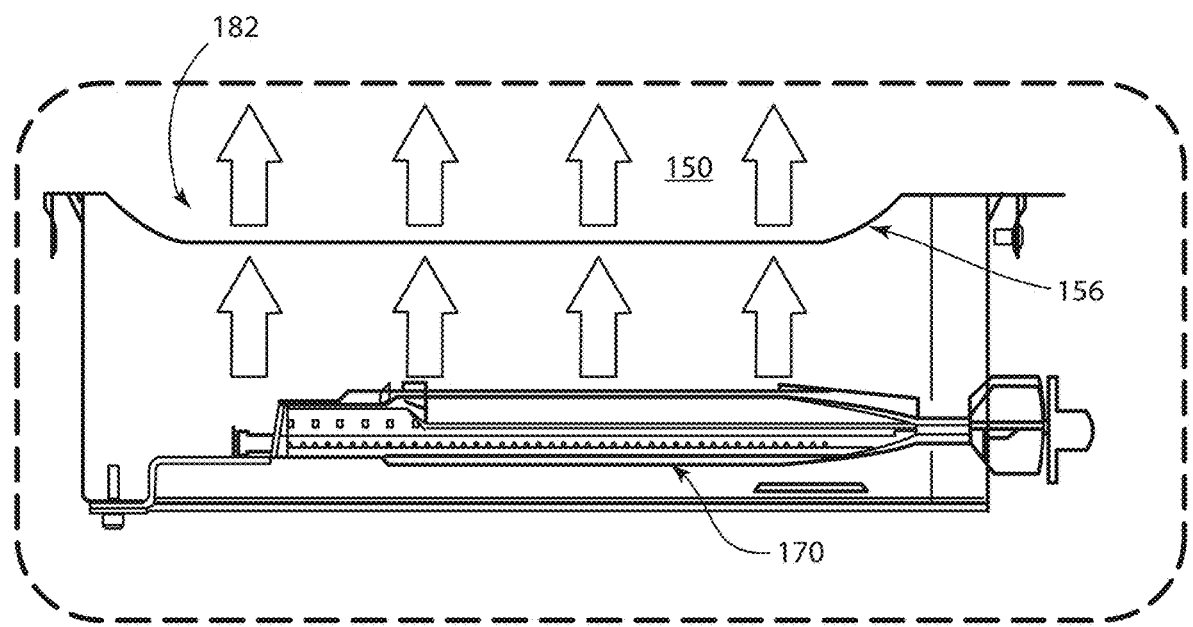
FIG. 10 is an enlarged detail view of the oven of FIG. 9 without the heat distribution shield.
Figure 11:
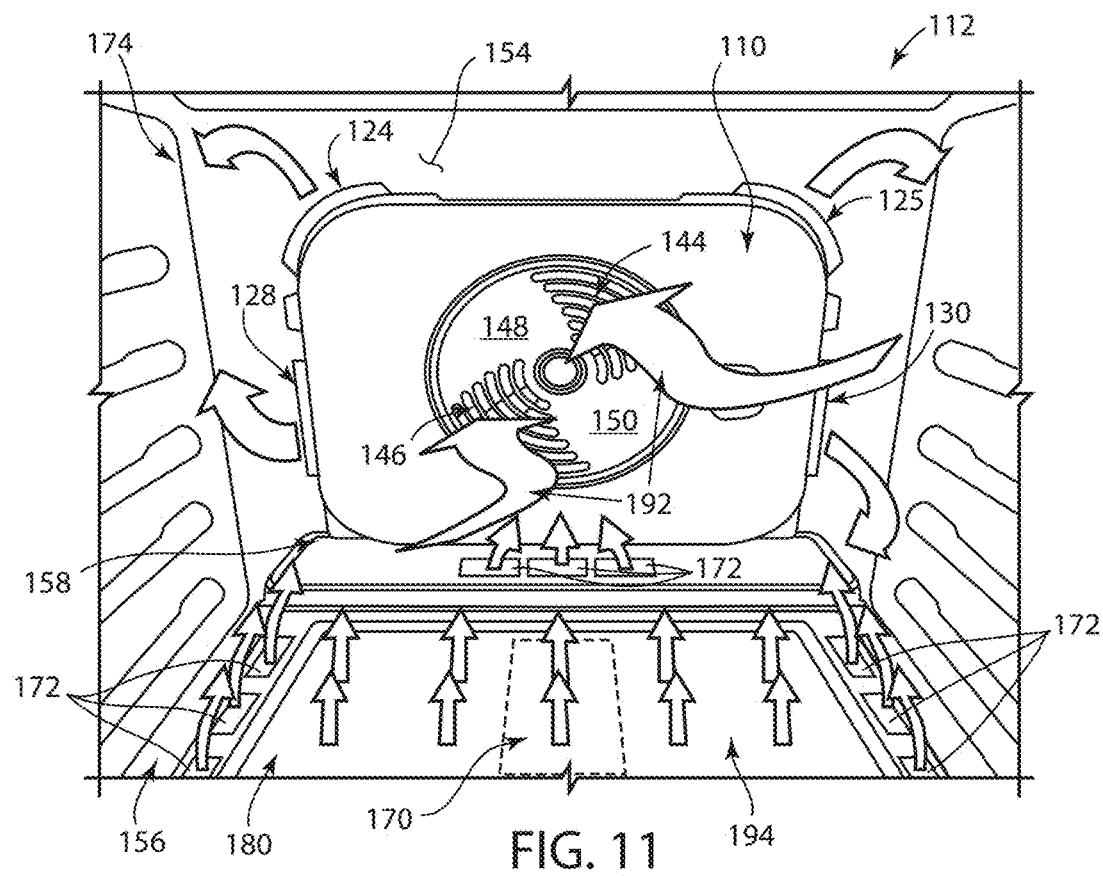
FIG. 11 is a perspective view of the interior of the oven depicting circulation of air achieved by the baffle unit with the heat distribution shield included.
Figure 12:
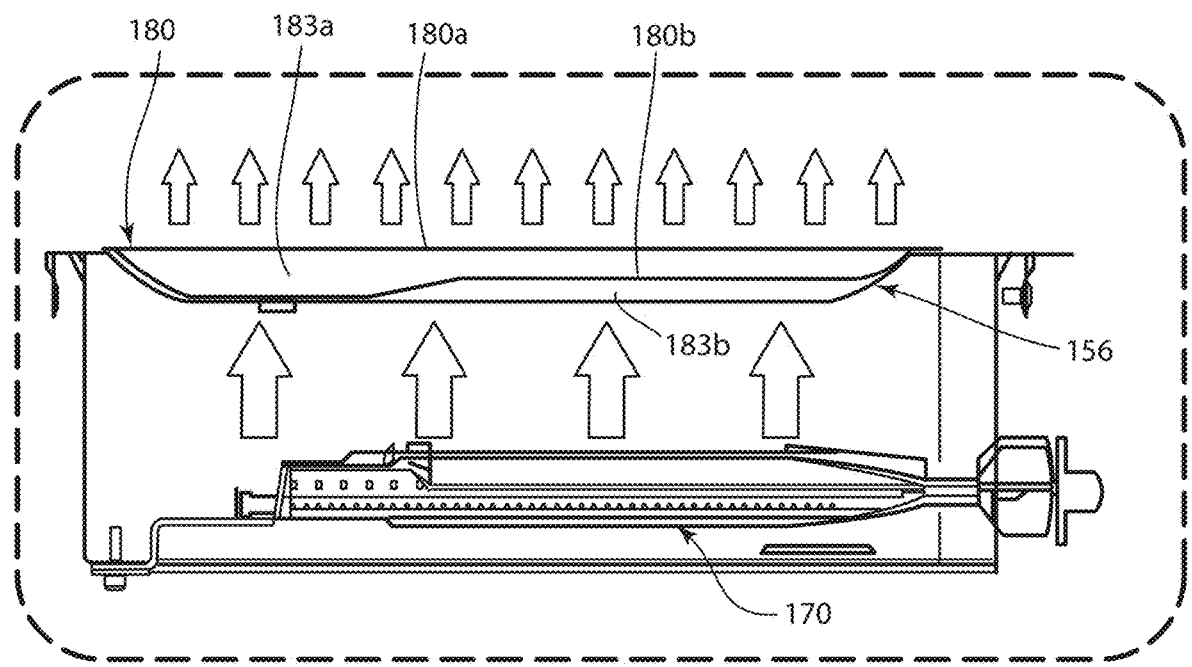
FIG. 12 is an enlarged detail side cross section view of the oven of FIG. 11.

Further, because the output flow of air is directed into the corresponding areas 96, 98, as shown in FIG. 6, the even heating is maintained even when such food items are large or are positioned on large baking sheets B or the like that would otherwise obstruct an indirectly-provided flow of air, including ones that generally rely on circulation throughout cavity 74 to distribute heat. Thus, the present arrangement can improve the ability to cook two items, including items of the same type (such as baked goods or other delicate items) over the same time and in a comparable manner in both positions 96, 98 of oven cavity 74. In this manner, other particular shapes of open areas 44, 46 and closed areas 48, 50 may be possible to achieve as similar effect and may be based on the particular structure or geometry of the respective fan and/or the structure and internal features of the particular baffle unit (including the incorporation, shape, and position of vanes, walls, etc.).

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An air baffle unit for use within an oven, the baffle unit comprising:

a major housing wall extending in first and second directions to define an exterior side and an interior side;

two upper corners output vent openings defined on top left and right corners of the baffle unit extending from an upper edge of the major housing wall on the interior side thereof;

first and second laterally opposed side vent openings defined along respective lateral sides of the baffle unit extending from respective side edges of the major housing wall on the interior side thereof; and an air intake opening arrangement defined within an intake area along the major housing wall and extending therealong in the first and second directions, the air intake opening arrangement including first and second pluralities of radially-spaced, concentric arced vent openings defining respective first and second open areas of the intake area by each vent opening extending circumferentially between sequential boundaries of the respective open area, with first and second closed areas extending uninterrupted and completely between the first and second open areas, the first and second open areas and the first and second closed areas each occupying a respective quarter of an entirety of the intake area, the open areas being displaced relative to each other in both the first direction and the second direction.

2. The air baffle unit of claim 1, wherein first and second axes extending, respectively, in the first and second directions, divide the intake area into the respective quarters, the first and second axes intersecting adjacent a geometric center of the major housing wall.

3. The air baffle unit of claim 2, wherein the first and second open areas are on opposite sides of both the first and second axes and extend generally away from an intersection of the axes.

4. The air baffle unit of claim 2, wherein the intake area defines a generally circular area disposed around the intersection of the axes.

5. The air baffle unit of claim 2, wherein the open areas of the intake area are open between the exterior and interior sides of the major housing wall, a fan being disposed on the interior side underlying the intake area.

6. The air baffle unit of claim 5, wherein:
the fan operating within the two open areas draw air in from the exterior through the open areas and directs air to the first and second lateral side vent openings and to the first and second upper corner vent openings.

7. The air baffle unit of claim 1, wherein each of the quarters is defined by curved boundary lines.

8. The air baffle unit of claim 7, wherein each of the quarters is propeller-shaped.

9. A convection unit for a gas oven, comprising:
an air baffle unit, including:
a major housing wall extending in first and second directions to define an exterior side and an interior side;
two upper output vent openings defined on top left and right corners of the baffle unit extending from an upper edge of the major housing wall on the interior side thereof;
first and second laterally opposed side vent openings defined along respective lateral sides of the baffle unit extending from respective side edges of the major housing wall on the interior side thereof; and
an air intake opening arrangement defined within an intake area along the major housing wall and extending therealong in the first and second directions, the air intake opening arrangement including first and second pluralities of radially-spaced, concentric arced vent openings defining respective first and second open areas of the intake area by each vent opening extending circumferentially between sequential boundaries of the respective open area, with first and second closed areas extending uninterrupted and completely between the first and second open areas, the first and second open areas and the first and second closed areas each occupying a respective quarter of an entirety of the intake area, the open areas being displaced relative to each other in both the first direction and the second direction; and
a fan disposed within the air baffle unit and including a plurality of blades extending radially from a first axis.

10. The convection unit of claim 9, wherein second and third axes extend the first and second directions, respectively, and divide the intake area into the respective quarters, the second and third axes intersecting along the first axis.

11. The convection unit of claim 10, wherein the intake area defines a generally circular area disposed around the first axis.

12. The convection unit of claim 10, wherein the open areas of the intake area are open between the exterior and interior sides of the major housing wall, the fan being disposed on the interior side underlying the intake area.

13. The convection unit of claim 12, wherein:
the fan underlying the open areas draws air in from the exterior through the open areas and directs air to the first and second side vent openings and to the first and second upper corner vent openings.

14. The convection unit of claim 9, wherein each of the quarters is defined by curved boundary lines.

15. The convection unit of claim 14, wherein each of the quarters is propeller-shaped.

16. An oven, comprising:
an interior cavity including an opening, a rear wall opposite the opening, and a floor extending between the opening and the rear wall; and
an air baffle unit including:
a major housing wall extending in first and second directions to define an exterior side and an interior side;
two upper output vent openings defined on top left and right corners of the baffle unit extending from an upper edge of the major housing wall on the interior side thereof;
first and second laterally opposed side vent openings defined along respective lateral sides of the baffle unit extending from respective side edges of the major housing wall on the interior side thereof; and
an air intake opening arrangement defined within an intake area along the major housing wall and extending therealong in the first and second directions, the air intake opening arrangement including first and second pluralities of radially-spaced, concentric arced vent openings defining respective first and second open areas of the intake area defining by each vent opening extending circumferentially between sequential boundaries of the respective open area, with first and second closed areas extending uninterrupted and completely between the first and second open areas, the first and second open areas and the first and second closed areas each occupying a respective quarter of entirety of the intake area, the open areas being displaced relative to each other in both the first direction and the second direction.

17. The oven of claim 16, wherein the air baffle unit is included within a convection unit disposed within the interior cavity of the oven and further including:
a fan having a plurality of blades extending radially from an axis.

18. The oven of claim 17, wherein the axis of the fan extends from the rear wall generally normal thereto and the air baffle unit is mounted on the rear wall.

19. The oven of claim 18, further comprising:
a burner unit having a heat output extending from the floor adjacent the rear wall, the fan drawing air through the open areas of the intake areas and distributing air flow among upper corners and side vent openings.

20. The oven of claim 16, wherein:
the upper corners output vent openings of the air baffle unit are defined between the upper edge of the major housing wall and the rear wall of the oven cavity; and
the lateral side vent openings of the air baffle unit are defined between the respective side edges of the major housing wall and the rear wall of the oven cavity.

* * * * *